US010523536B2

(12) United States Patent
Rosenberg et al.

(10) Patent No.: US 10,523,536 B2
(45) Date of Patent: Dec. 31, 2019

(54) LENGTH CONTROL FOR PACKET HEADER SAMPLING

(71) Applicant: Telefonaktiebolaget LM Ericsson (publ), Stockholm (SE)

(72) Inventors: Jonas Emanuel Rosenberg, Stockholm (SE); Daniel Kang, Beijing (CN); Shahryar Khan, Stockholm (SE); Shuo Yang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/769,417

(22) PCT Filed: Oct. 26, 2015

(86) PCT No.: PCT/EP2015/074738
§ 371 (c)(1),
(2) Date: Apr. 19, 2018

(87) PCT Pub. No.: WO2017/071730
PCT Pub. Date: May 4, 2017

(65) Prior Publication Data
US 2018/0309647 A1 Oct. 25, 2018

(51) Int. Cl.
*H04L 12/26* (2006.01)
*H04L 29/06* (2006.01)

(52) U.S. Cl.
CPC ......... *H04L 43/022* (2013.01); *H04L 43/026* (2013.01); *H04L 43/028* (2013.01);
(Continued)

(58) Field of Classification Search
CPC ......... H04L 12/24; H04L 12/26; H04L 29/06; H04L 29/0604; H04L 29/0653;
(Continued)

(56) References Cited

U.S. PATENT DOCUMENTS 7,239,639 B2\* 7/2007 Cox .................... H04L 45/7457
370/395.43
7,644,157 B2\* 1/2010 Shomura ............... H04L 43/022
370/235
(Continued)

FOREIGN PATENT DOCUMENTS

EP 2667545 A1 11/2013

OTHER PUBLICATIONS

Sadasivan, G., "Architecture for IP Flow Information Export", Network Working Group, Request for Comments: 5470, Category: Informational, Mar. 1, 2009, pp. 1-31, IETF.
(Continued)

*Primary Examiner* — Tri H Phan
(74) *Attorney, Agent, or Firm* — Sage Patent Group

(57) ABSTRACT

A network node (110) samples data packets of network traffic. For each sampled data packet, the network node (110) compares a packet header of the sampled data packet to a set of one or more packet header patterns. Depending on the comparison, the network node (110) determines a length of a packet header portion to be extracted from the sampled data packet. Then the network node (110) extracts the packet header portion of the determined length from the sampled data packet and generates a datagram comprising the extracted packet header portions of the sampled data packets.

25 Claims, 10 Drawing Sheets

(52) U.S. Cl.
CPC .............. *H04L 43/04* (2013.01); *H04L 43/18* (2013.01); *H04L 69/22* (2013.01)

(58) Field of Classification Search
CPC ... H04L 29/08783; H04L 41/14; H04L 43/02; H04L 43/022; H04L 43/024; H04L 43/026; H04L 43/028; H04L 43/04; H04L 43/18; H04L 69/22; H04L 12/741; H04L 12/743; H04L 12/745; H04L 27/2338; H04L 29/06578; H04L 49/3009; H04L 49/309; H04L 67/2828; H04L 69/04; H04W 28/06; H03M 7/30
See application file for complete search history.

(56) References Cited

U.S. PATENT DOCUMENTS

| | | | | |
|---|---|---|---|---|
| 7,787,442 B2* | 8/2010 | Akahane | ................ | H04L 43/00 370/352 |
| 7,957,396 B1* | 6/2011 | Kohn | ................ | H04L 47/2441 370/395.32 |
| 8,089,948 B2* | 1/2012 | Garudadri | ............... | H04L 29/06 370/349 |
| 8,189,576 B2* | 5/2012 | Ferguson | .......... | H04L 29/06095 370/389 |
| 8,718,064 B2* | 5/2014 | Beliveau | ............... | H04L 67/327 370/392 |
| 9,065,767 B2* | 6/2015 | Dong | ...................... | H04L 47/38 |
| 9,077,668 B2* | 7/2015 | Beliveau | ............... | H04L 67/327 |
| 9,118,571 B2* | 8/2015 | Bisht | ..................... | H04L 47/125 |
| 9,313,300 B2* | 4/2016 | Akhter | ................... | H04L 69/04 |
| 9,537,769 B2* | 1/2017 | Bryant | .................. | H04L 45/745 |
| 10,333,854 B2* | 6/2019 | Chen | ...................... | H04L 43/00 |
| 2003/0123452 A1 | 7/2003 | Cox et al. | | |
| 2004/0136368 A1 | 7/2004 | Wakayama et al. | | |
| 2013/0304915 A1* | 11/2013 | Kawai | .................. | H04L 43/026 709/224 |

OTHER PUBLICATIONS

Phaal, P. et al., "sFlow Version 5", Jul. 1, 2004, pp. 1-44, sFlow.org, retreived from internet: https://sflow.org/sflow_version_5.txt, retrieved on Nov. 29, 2016.

Filsfils, C. et al., "Segment Routing", Presentation, Nov. 1, 2015, pp. 1-15, Cisco Systems.

Filsfils, C. et al., "Segment Routing Architecture", Network Working Group, Internet-Draft, Intended status: Standards Track, Nov. 19, 2016, pp. 1-29, IETF.

Sourdins, I. et al., "Packet Pre-Filtering for Network Intrusion Detection", ANCS'06, Dec. 3, 2006, pp. 183-192, San Jose, CA, US, Retrieved from internet: http://ce-publications.et.tudelft.nl/publications/767_packet_prefiltering_for_network_intrusion_detection.pdf.

* cited by examiner

| ID | Header Encapsulation Pattern |
|---|---|
| 1 | <802.1Q, MPLS, IPv4, UDP> |
| 2 | <802.1Q, MPLS, IPv4> |
| 3 | <802.1Q, MPLS, IPv6> |
| 4 | |

FIG. 3

LENGTH CONTROL FOR PACKET HEADER SAMPLING

TECHNICAL FIELD

The present invention relates to methods for monitoring network traffic and to corresponding devices and systems.

BACKGROUND

In communication networks, it is known to monitor data packets of traffic transmitted through the communication network, traffic based on the Internet Protocol (IP). For example, a technology referred to as "sFlow", e.g., specified in RFC 3176 (September 2001) or the sFlow Version 5 memo by InMon Corp, Marc Lavine, Foundry Networks, available under http://www.sFlow.org (July 2004), may be embedded within network nodes, in particular switches and routers. The sFlow technology to allows for continuously monitoring application level traffic flows. This may be accomplished at wire speed and simultaneously on all interfaces of the respective network node.

In the sFlow technology, an sFlow Agent runs as part of network management software within the network node. The sFlow agent combines interface counters and flow samples into sFlow datagrams. The network node sends the sFlow datagrams an sFlow Collector, which is responsible for collecting sFlow datagrams from a plurality of network nodes running an sFlow Agent. At the sFlow Collector, the sFlow datagrams may be analyzed to produce a rich, real-time, network-wide view of traffic flows.

In typical scenarios, information carried in packet headers of the monitored data packets may be used as a basis for flow analysis. In this case, the sFlow Agent may extract a packet header from the monitored data packet and include it into the sFlow datagram. For controlling the extraction of the packet header portion, a parameter referred to as MaximumHeaderLength is configured, and a string having a length corresponding to this parameter is extracted from each monitored data packet. The MaximumHeaderLength is usually set sufficiently long so that all relevant information in the packet header is covered, irrespective of possible variations in the structure or contents of the packet headers.

For example, such variations in the structure or contents of the packet headers may occur in a transport network utilizing Segment Routing (SR), e.g., as described in the Internet-Draft "Segment Routing Architecture", draft-ietf-spring-segment-routing-06 (Oct. 14, 2015). In the case of SR, a router calculates a forwarding path (list of segments) for a data packet and embeds this information into a Segment ID stack in the packet header. With increasing complexity of the calculated forwarding path, also the depth of the Segment ID stack increases and may thus vary from flow to flow. Further, the Segment ID stack also changes during the forwarding of the data packet. (Typically the depth of the Segment ID stack decreases by one when the packet is forwarded from one segment to the next segment of the forwarding path.)

To ensure that all the relevant information from the packet headers is extracted, the MaximumHeaderLength parameter needs to be configured sufficiently high, e.g., using a reasonably estimate for a maximum depth of the Segment ID stack and some additional margin. However if a given data packet contains a Segment ID stack of lower depth, the extracted packet header portion will also include unnecessary bytes which are then included into the sFlow datagram. This may result in inefficient usage of transmission bandwidth and/or processing resources. For example, in the case of IP/SR packet headers, a MaximumHeaderLength corresponding to 82 bytes may be needed when aiming at completely extracting the packet header of a data packet in which the depth of the Segment ID stack is 12 (i.e., includes 12 Segment IDs). On the other hand, the length of a packet header of a data packet in which the depth of the Segment ID stack is only one may be only 38 bytes, which means that 44 bytes of unnecessary information would be included into the sFlow datagram.

Accordingly, there is a need for techniques which allow for efficiently extracting header information from monitored data packets.

SUMMARY

According to an embodiment of the invention, a method of monitoring network traffic is provided. According to the method, a network node samples data packets of network traffic. For each sampled data packet, the network node compares a packet header of the sampled data packet to a set of one or more packet header patterns. Depending on the comparison, the network node determines a length of a packet header portion to be extracted from the sampled data packet. Then the network node extracts the packet header portion of the determined length from the sampled data packet and generates a datagram comprising the extracted packet header portions of the sampled data packets.

According to a further embodiment of the invention, a method of controlling monitoring of network traffic is provided. According to the method, a management node determines a set of one or more packet header patterns. The management node then sends configuration information indicating the set of one or more packet header patterns to at least one network node configured to sample data packets of network traffic. The set of one or more packet header patterns enables the at least one network node to compare, for each sampled data packet, a packet header of the sampled data packet to the set of one or more packet header patterns; depending on the comparison, determine a length of a packet header portion to be extracted from the sampled data packet; extract the packet header portion of the determined length from the sampled data packet; and generate a datagram comprising the extracted packet header portions of the sampled data packets.

According to a further embodiment of the invention, a network node is provided. The network node is configured to sample data packets of network traffic. Further, the network node is configured to, for each sampled data packet, compare a packet header of the sampled data packet to a set of one or more packet header patterns. Further, the network node is configured to, depending on the comparison, determine a length of a packet header portion to be extracted from the sampled data packet. Further, the network node is configured to extract the packet header portion of the determined length from the sampled data packet and generate a datagram comprising the extracted packet header portions of the sampled data packets.

According to a further embodiment of the invention, a management node is provided. The management node is configured to determine a set of one or more packet header patterns. Further, the management node is configured to send configuration information indicating the set of one or more packet header patterns to at least one network node configured to sample data packets of network traffic. The set of one or more packet header patterns enables the at least one network node to compare, for each sampled data packet, a packet header of the sampled data packet to the set of one or more packet header patterns; depending on the comparison, determine a length of a packet header portion to be extracted from the sampled data packet; extract the packet header portion of the determined length from the sampled data packet; and generate a datagram comprising the extracted packet header portions of the sampled data packets.

According to a further embodiment of the invention, a system is provided. The system comprises a plurality of network nodes and a further network node. The plurality of network nodes are configured to sample data packets of network traffic; for each sampled data packet; compare a packet header of the sampled data packet to a set of one or more packet header patterns; depending on the comparison, determine a length of a packet header portion to be extracted from the sampled data packet; extract the packet header portion of the determined length from the sampled data packet; and generate a datagram comprising the extracted packet header portions of the sampled data packets. The further network node is configured to receive the datagrams from the plurality of network nodes; and analyze the received datagrams. According to an embodiment, the system may further comprise a management node configured to determine the set of one or more packet header patterns and to send configuration information indicating the set of one or more packet header patterns to the plurality of network nodes.

According to a further embodiment of the invention, a computer program or computer program product is provided, e.g., in the form of a non-transitory storage medium, which comprises program code to be executed by at least one processor of a network node. Execution of the program code causes the network node to sample data packets of network traffic. Further, execution of the program code causes the network node to, for each sampled data packet, compare a packet header of the sampled data packet to a set of one or more packet header patterns. Further, execution of the program code causes the network node to, depending on the comparison, determine a length of a packet header portion to be extracted from the sampled data packet. Further, execution of the program code causes the network node to extract the packet header portion of the determined length from the sampled data packet and generate a datagram comprising the extracted packet header portions of the sampled data packets.

According to a further embodiment of the invention, a computer program or computer program product is provided, e.g., in the form of a non-transitory storage medium, which comprises program code to be executed by at least one processor of a management node.

Execution of the program code causes the management node to determine a set of one or more packet header patterns. Further, execution of the program code causes the management node to send configuration information indicating the set of one or more packet header patterns to at least one network node configured to sample data packets of network traffic. The set of one or more packet header patterns enables the at least one network node to compare, for each sampled data packet, a packet header of the sampled data packet to the set of one or more packet header patterns; depending on the comparison, determine a length of a packet header portion to be extracted from the sampled data packet; extract the packet header portion of the determined length from the sampled data packet; and generate a datagram comprising the extracted packet header portions of the sampled data packets.

Details of such embodiments and further embodiments will be apparent from the following detailed description of embodiments.

BRIEF DESCRIPTION OF THE DRAWINGS

FIG. 3 shows an example of a set of packet header patterns as utilized in an embodiment of the invention.

DETAILED DESCRIPTION OF EMBODIMENTS

Figure 1:
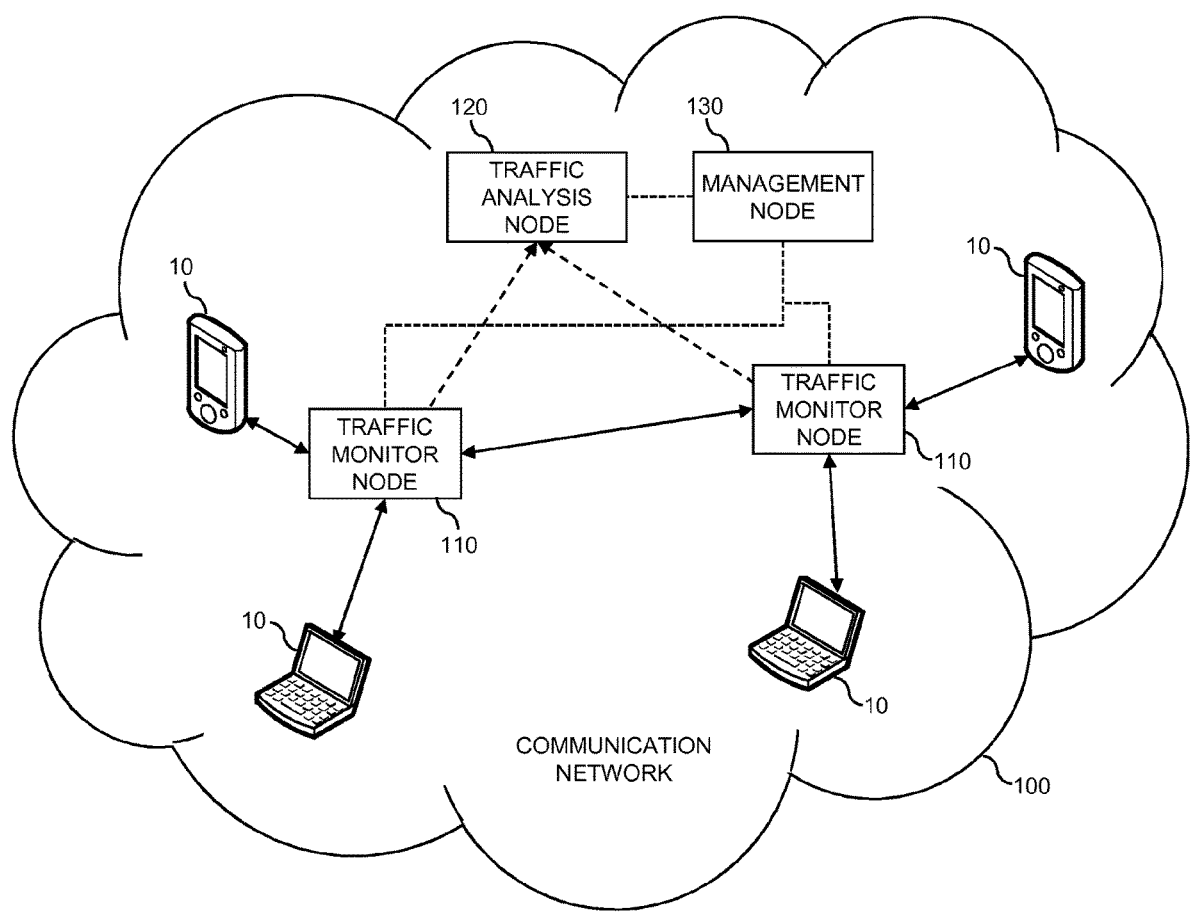
FIG. 1 schematically illustrates an example of a traffic monitoring architecture according to an embodiment of the invention.

In the following, concepts in accordance with exemplary embodiments of the invention will be explained in more detail and with reference to the accompanying drawings. The illustrated embodiments relate to monitoring of traffic a communication network. The communication network may for example be a transport network of a mobile communication network, e.g., as specified by 3GPP ($3^{rd}$ Generation Partnership Project). However, it is to be understood that the illustrated concepts may also be applied in other kinds of communication networks, e.g., Local Area Networks (LANs), or Wide Area Networks (WANs), and that such communication networks may be based on various kinds of networking technologies, including Ethernet based wired networking technologies, Digital Subscriber Line (DSL) technologies, optical fiber technologies, and/or coaxial cable technologies. Further, such communication networks may be based on various kinds of communication protocols. Further, the communication network may apply various kinds of technologies to achieve efficient transport of the data packets through the communication network, such as the SR technology described in the Internet-Draft "Segment Routing Architecture", draft-ietf-spring-segment-routing-06 (Oct. 14, 2015) or the MPLS (Multi Protocol Label Switching) technology as specified in IETF RFC 3031 (January 2001).

In the illustrated concepts, data packets transmitted through the communication network, in the following also referred to as data packets of network traffic, may be sampled by certain nodes of the communication network, in the following also referred to as network nodes. Such network nodes may be responsible for forwarding the data packets towards their destination(s), e.g., correspond to routers or switches. The network traffic may include user traffic, i.e., traffic to or from end users. However, in some cases the network traffic may also include control traffic, i.e., traffic generated by control nodes within the communication network. From each sampled data packet, a packet header portion is extracted into a datagram. Such datagram may then form the basis of analyzing the network traffic, e.g., in order to visualize or otherwise evaluate flows of data packets through the communication network. The datagram may for example correspond to an sFlow datagram as specified in RFC 3176 (September 2001) or the sFlow Version 5 memo by InMon Corp, Marc Lavine, Foundry Networks, available under http://www.sFlow.org (July 2004). In the illustrated concepts, a length of the packet header portion extracted from the sampled data packet may be set individually for each sampled data packet. For this purpose, a packet header of the sampled data packet may be compared to a set of one or more packet header patterns, and the length of the packet header portion to be extracted determined depending on this comparison. Thus, the extracted packet header portion may be accurately controlled in such a way that packet header information of interest is covered, while avoiding extracting unnecessary information, even if the sampled data packets includes packet headers which vary with respect to content and/or structure. Through management procedures, such set of packet header patterns may be configured in each network node which participates in the monitoring of network traffic.

FIG. 1 schematically illustrates an exemplary architecture of the communication network, that may be used for implementing the illustrated concepts. As shown in FIG. 1, the communication network 100 includes a plurality of devices 10 which communicate through the communication network 100. Such devices 10 may correspond to user terminals, such as computers, smartphones, tablets, or the like. However, also other kinds of devices may generate and/or receive the network traffic, such as servers or machine-type communication (MTC) devices. As examples of the network nodes which are responsible for monitoring the network traffic FIG. 1 shows illustrates traffic monitor nodes 110. As mentioned above, such traffic monitor node 110 may for example correspond to a router or switch, e.g., within a transport network part of the communication network.

Further, FIG. 1 shows a traffic analysis node 120 and a management node 130. The traffic analysis node 120 is responsible for collecting the datagrams generated by the traffic monitor nodes 110 and analyzing the network traffic based on the collected datagrams. The management node 130 is responsible for configuring the traffic monitor nodes 110 and/or the traffic analysis node 120. Specifically, this configuration may involve providing the set of one or more packet header patterns to the traffic monitor nodes 110. Further, this configuration may also involve configuring the traffic analysis node 120 with respect to a type of analysis to be performed based on the extracted packet header information.

As mentioned above, the datagrams may correspond to sFlow datagrams. In such scenarios, each of the traffic monitor nodes 110 may implement an sFlow Agent, which generates the sFlow datagram, while the traffic analysis node 120 may implement an sFlow Collector, which collects the sFlow datagrams from the sFlow Agents. Further details of a corresponding implementation of the traffic monitor node 110 are illustrated in FIG. 2.

Figure 2:
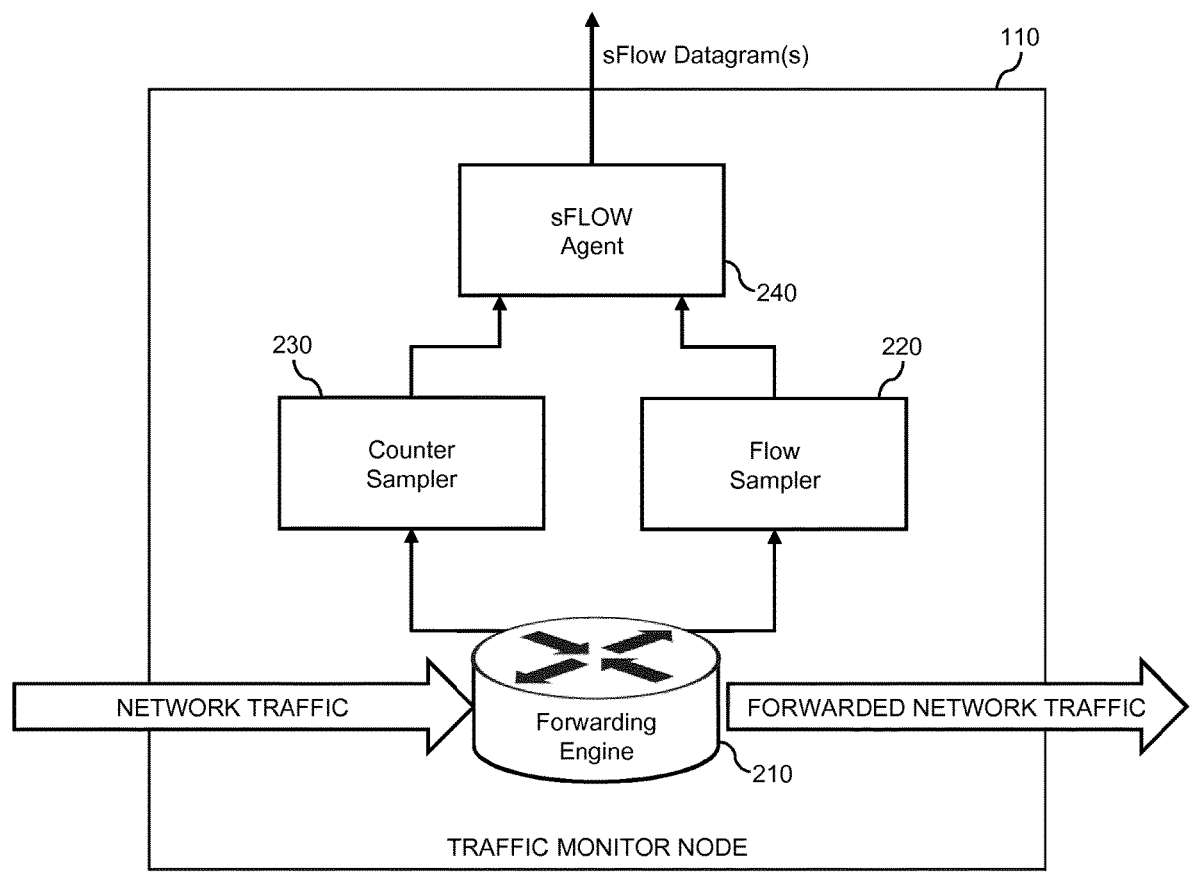
FIG. 2 schematically illustrates a traffic monitor node according to an embodiment of the invention.

As shown in FIG. 2, the traffic monitor node 110 includes a forwarding engine 210 which is responsible for receiving data packets of the network traffic and forwarding the received data packets of the network traffic towards their destination. For this purpose, the forwarding engine 210 may apply a conventional switching algorithm and/or a routing algorithm. Further, the forwarding engine may also apply more advanced transport technologies, such as the above-mentioned SR technology.

As further illustrated, the traffic monitor node 110 is provided with a flow sampler 220 which is responsible for sampling at least some of the forwarded data packets and extracting a packet header portion from each sampled data packet. The sampling may for example be based on random selection of a fraction of the data packets from a data source, e.g., one of the devices 10. The random selection may involve selection of data packets according to a configured sampling probability (e.g., a sampling probability of $1/10000$). The process of extracting the packet header portion may involve truncating the sampled data packet at a given length.

In addition, the traffic monitor node 110 may also be provided with a counter sampler 230 which is responsible for periodic sampling or polling of counters associated with a data source, e.g., one of the devices 10. Such counters may for example count a number of transferred data packets and/or a number of transferred bytes. Further, the traffic monitor node 110 is provided with an sFlow Agent 240. The sFlow Agent 240 may act as a control logic for the monitoring process. Responsibilities of the sFlow Agent 240 may include control of sampling on a certain port, on a certain interface, or on a certain data source. Further, the responsibilities of the sFlow Agent 240 are assumed to include receiving the extracted packet header portions from the flow sampler 220 and receiving sampled counter values from the counter sampler 230 and generating sFlow datagrams therefrom. Such sFlow datagram typically includes multiple extracted packet header portions. The number of extracted packet header portions in the sFlow datagram may depend on a maximum size of the sFlow datagram, on lengths of the extracted packet header portions, and/or on a configured maximum delay (before sending the sFlow datagram).

For providing the above-mentioned flexible determination of the length of the extracted packet header portion, the flow sampler 220 may utilize a configurable table which defines the set of one or more packet header pattern. In the following, such packet header pattern is also referred to as Header Encapsulation Pattern (HEP), and the set of one or more packet header patterns is also referred to as HEP list. An example of such HEP list is shown in FIG. 3. In the example of FIG. 3, the HEP list includes three HEPs, each identified by a corresponding identifier (ID). A first HEP (with ID 1) is defined as "<802.1Q, MPLS, IPv4, UDP>". This means that the corresponding protocol header results from utilizing UDP (User Datagram Protocol) encapsulation over IPv4 (Internet Protocol version 4) encapsulation over MPLS (Multi Protocol Label Switching) encapsulation over encapsulation according to IEEE 802.1Q. A second HEP (with ID 2) is defined as "<802.1Q, MPLS, IPv4 >". This means that the corresponding protocol header results from utilizing IPv4 encapsulation over MPLS encapsulation over encapsulation according to IEEE 802.1Q. A third HEP (with ID 3) is defined as "<802.1Q, MPLS, IPv6 >". This means that the corresponding protocol header results from utilizing IPv6 (Internet Protocol version 6) encapsulation over MPLS (Multi Protocol Label Switching) encapsulation over encapsulation according to IEEE 802.1Q. As can be seen, each HEP corresponds to a sequence of protocol headers which may occur in the packet header of the sampled data packets.

The flow sampler 220 may utilize various methods to determine and identify protocol header types in the packet header. For example, the flow sampler 220 may utilize interface configuration information to determine outer protocol headers. Further, the flow sampler 220 may process header information of the sampled data packet to identify protocol header types existing in the packet header. The flow sampler 220 then compares the packet header to the HEPs of the HEP list and identifies the HEP which best matches the packet header of the sampled data packet. The length of the extracted packet header portion is then determined in such a way that the protocol headers included in the best matching HEP are covered, while protocol headers corresponding to further (inner) encapsulation layers are not extracted. This is accomplished per sampled data packet. In cases where no matching HEP is found in the HEP list, the flow sampler 220 may set the length of the packet header portion to correspond to a configured maximum length, e.g., as defined by the MaximumHeaderLength parameter of the sFlow technology. For example, if the sampled data packet is based on UDP encapsulation over IPv4 encapsulation over MPLS encapsulation over encapsulation according to IEEE 802.1Q, the best matching HEP from the HEP list of FIG. 3 would be the first HEP (with ID 1). The flow sampler 220 may then determine the extracted packet header portion to extend from a heading byte of an L2 (Layer 2) protocol header (e.g., Ethernet header or other outermost protocol header) up to a last byte of the UDP protocol header, irrespective of a number of MPLS labels included in the MPLS protocol header, and irrespective of a number of option fields included in the IPv4 protocol header.

Figure 4A:
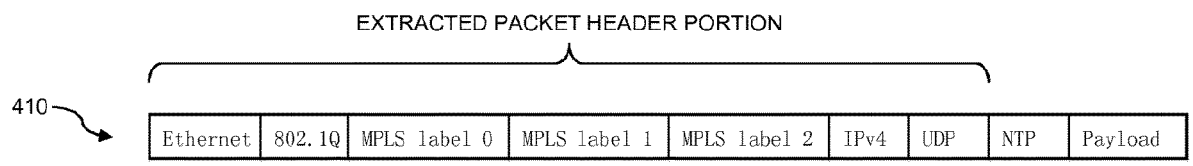
FIGS. 4A, 4B, and 4C show examples of data packets from which packet header portions of different lengths are extracted according to an embodiment of the invention.
Figure 4B:
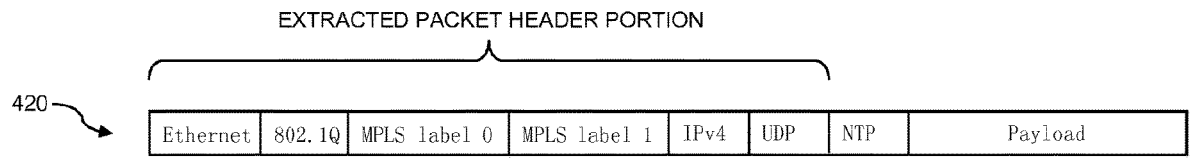
Figure 4C:
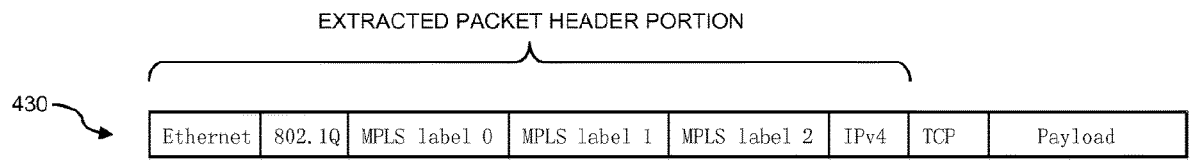

FIGS. 4A, 4B, and 4C illustrate examples how the length of the extracted packet header portion may be determined based on the HEP list of FIG. 3.

According to a first example, a sampled data packet 410 includes a payload section encapsulated, in this order, according to NTP (Network Time Protocol), UDP, IPv4, MPLS, and IEEE 802.1Q in an Ethernet frame. The MPLS protocol header includes three MPLS labels (MPLS label 0, MPLS label 1, MPLS label 2). In this example, matching HEPs in the HEP list of FIG. 3 are the first HEP (with ID 1) and the second HEP (with ID 2). Because the first HEP includes more matching protocol headers than the second HEP (which does not include the UDP protocol header), it is considered as the best match. Accordingly, the flow sampler 220 would determine the length of the packet header portion extracted from the data packet 410 in such a way that it extends to include the UDP protocol header, but not the NTP protocol header.

According to a second example, a sampled data packet 420 includes a payload section encapsulated, in this order, according to NTP (Network Time Protocol), UDP, IPv4, MPLS, and IEEE 802.1Q in an Ethernet frame. The MPLS protocol header includes two MPLS labels (MPLS label 0, MPLS label 1). Also in this example, matching HEPs in the HEP list of FIG. 3 are the first HEP (with ID 1) and the second HEP (with ID 2), and the first HEP is the best match. Accordingly, the flow sampler 220 would determine the length of the packet header portion extracted from the data packet 420 in such a way that it extends to include the UDP protocol header, but not the NTP protocol header. As can be seen, due to the data packet 420 having a lower number of MPLS labels than the data packet 410, the packet header portion extracted from the data packet 420 is shorter than the packet header portion extracted from the data packet 410.

According to a third example, a sampled data packet 430 includes a payload section encapsulated, in this order, according to TCP (Transmission Control Protocol), IPv4, MPLS, and IEEE 802.1Q in an Ethernet frame. The MPLS protocol header includes three MPLS labels (MPLS label 0, MPLS label 1, MPLS label 2). In this example, the only matching HEP in the HEP list of FIG. 3 is the first HEP (with ID 1). Accordingly, the flow sampler 220 would determine the length of the packet header portion extracted from the data packet 430 in such a way that it extends to include the IPv4 protocol header, but not the TCP protocol header. As can be seen, even though the data packet 430 has the same number of MPLS labels as the data packet 410, the packet header portion extracted from the data packet 430 is shorter than the packet header portion extracted from the data packet 410, because the packet header of the data packet 430 has a different structure than the packet header of the data packet 410.

Figure 5:
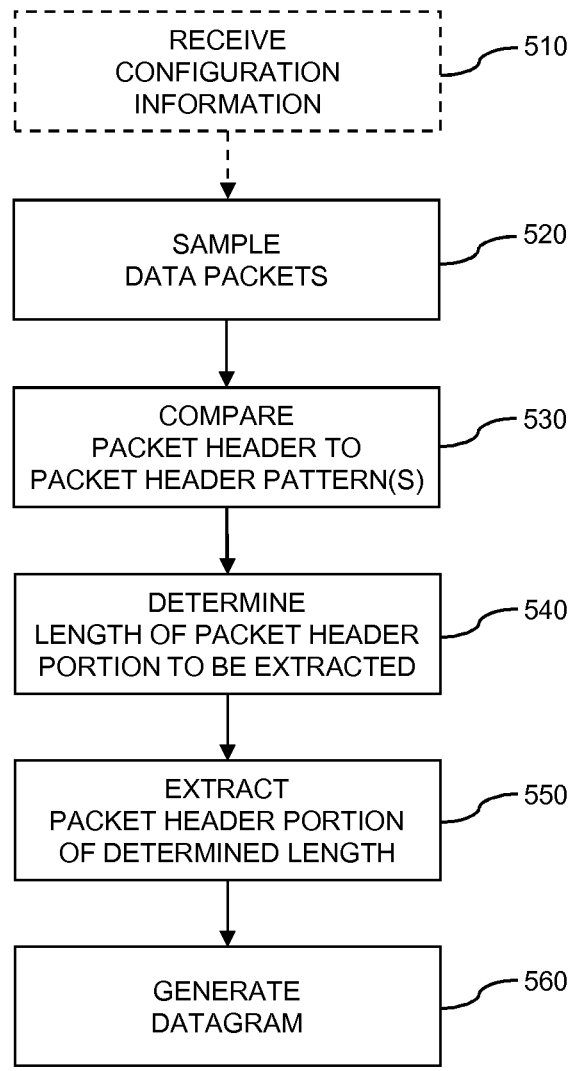
FIG. 5 shows a flowchart for schematically illustrating a method of monitoring network traffic according to an embodiment of the invention.

FIG. 5 shows a flowchart for illustrating a method which may be utilized for implementing the illustrated concepts in a network node, e.g., in one of the traffic monitor nodes 110. The network node may for example correspond to a router or switch. If a processor-based implementation of the network node is used, the steps of the method may be performed by one or more processors of the network node. In such a case the network node may further comprise a memory in which program code for implementing the below described functionalities is stored.

At optional step 510, the network node may receive configuration information. The network node may receive the configuration information from a management node, e.g., the management node 130. The configuration information may indicate a set of one or more packet header patterns.

At step 520, the network node samples data packets of network traffic. This may involve randomly selecting data packets from network traffic forwarded by the network node.

At step 530, the network node compares a packet header of the sampled data packet to a set of one or more packet header patterns. Each packet header pattern may be defined by a sequence of one or more protocol types. Examples of such packet header patterns are illustrated in FIG. 3. The set of packet header patterns may for example be indicated by the configuration information optionally received at step 510.

At step 540, the network node determines a length of a packet header portion to be extracted from the sampled data packet. This is accomplished depending on the comparison of step 520. For example, based on the comparison, the network node may determine a packet header pattern from the set which best matches the packet header of the sampled data packet. The network node may then determining the length in such a way that the packet header portion to be extracted includes protocol headers corresponding to the sequence of protocol types defining the best matching packet header pattern. Examples of corresponding determinations are explained in connection with FIGS. 4A, 4B, and 4C.

In some scenarios, the network node may identify in the sampled data packet a first byte of a first protocol header of the sequence of protocol types defining the best matching packet header pattern and a last byte of a last protocol header of the sequence of protocol types defining the best matching packet header pattern. The network node may then determine the packet header portion to be extracted to extend from the first byte of the first protocol header of the sequence of protocol types defining the best matching packet header pattern to the last byte of the last protocol header of the sequence of protocol types defining the best matching packet header pattern. In this way, the extracted packet header portion may be truncated at both ends to cover only header information of interest. In other scenarios, the extracted packet header portion may be truncated at only one end (towards a payload section of the sampled data packet, at the end corresponding to higher level protocols), such as explained in connection with the examples of FIGS. 4A, 4B, and 4C.

In response to identifying no packet header pattern from the set which matches the packet header of the sampled data packet, the network node may determine the length to correspond to a configured maximum length, e.g., as defined by the MaximumHeaderLength parameter of the sFlow technology.

At step 550, the network node extracts the packet header portion of the determined length from the sampled data packet.

Steps 530 to 550 are performed for each sampled data packet.

At step 560, the network node generates a datagram comprising the extracted packet header portions of the sampled data packets. The length of the packet header portion extracted from the sampled data packet may differ between at least some of the sampled data packets.

The network node may then transmit the datagram to a further network node for analysis, e.g., to the traffic analysis node 120. In some scenarios, the datagram may correspond to an sFlow datagram. The further network node may then include an sFlow Collector. However, it is to be understood that other datagram formats could be utilized as well.

Figure 6:
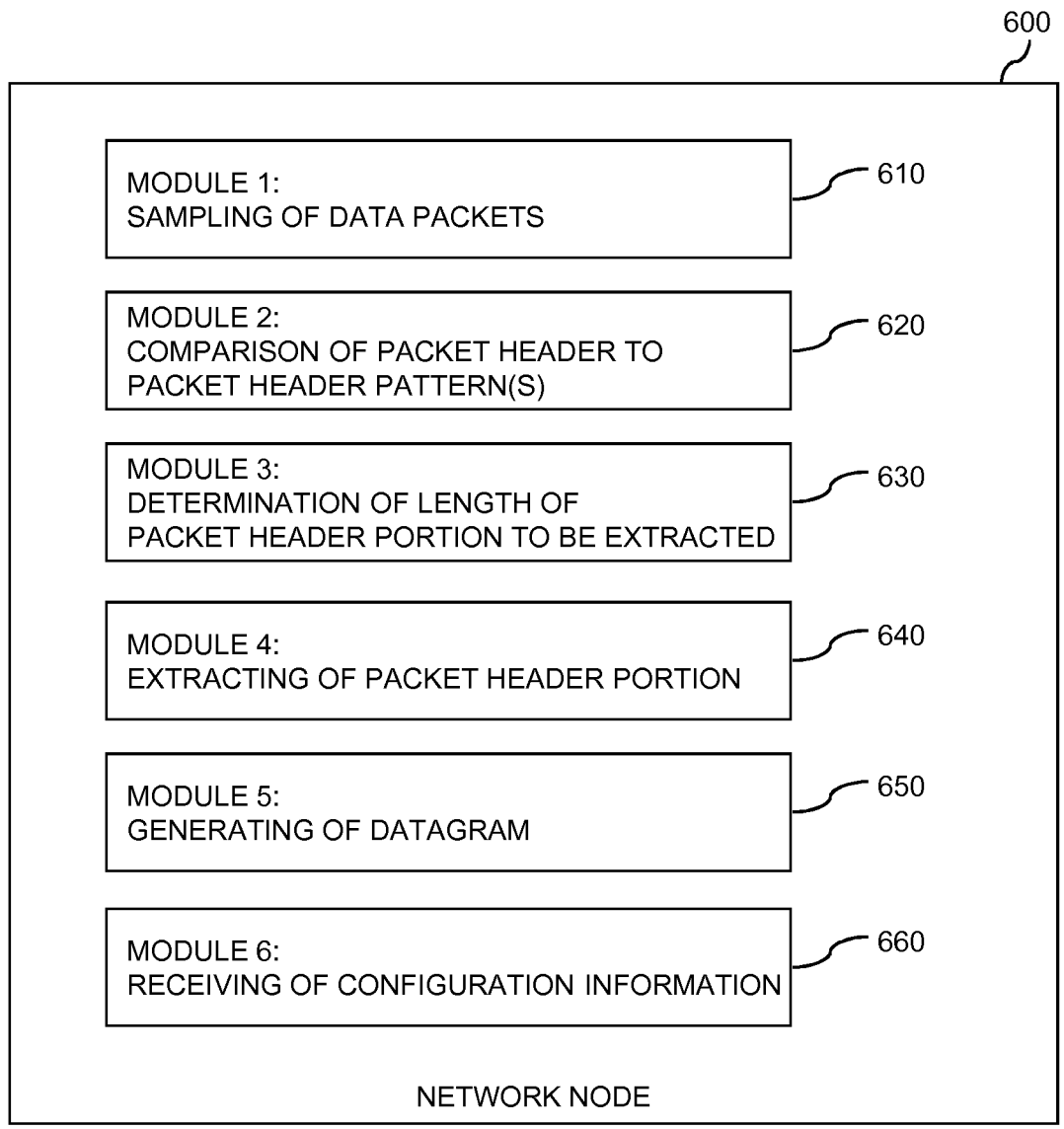
FIG. 6 shows a block diagram for illustrating functionalities of a network node according to an embodiment of the invention.

FIG. 6 shows a block diagram for illustrating functionalities of a network node 600 which operates according to the method of FIG. 5. As illustrated, the network node 600 may be provided with a module 610 configured to sample data packets of network traffic, such as explained in connection with step 520. Further, the network node 600 may be provided with a module 620 configured to compare, for each sampled data packet, a packet header of the sampled data packet to a set of one or more packet header patterns, such as explained in connection with step 530. Further, the network node 600 may be provided with a module 630 configured to determine, depending on the comparison, a length of a packet header portion to be extracted from the sampled data packet, such as explained in connection with step 540. Further, the network node 600 may be provided with a module 640 configured to extract the packet header portion of the determined length from the sampled data packet, such as explained in connection with step 550. Further, the network node 600 may be provided with a module 650 configured to generate a datagram comprising the extracted packet header portions of the sampled data packets, such as explained in connection with step 560. Further, the network node 600 may be provided with a module 660 configured to receive configuration information indicating the set of one or more packet header patterns from a management node, such as explained in connection with step 510.

It is noted that the network node 600 may also include further modules for implementing other functionalities as described above, such as functionalities for sending the datagram to the further network node. Further, it should be understood that the modules of the network node 600 do not necessarily represent a hardware structure of the network node 600, but may also correspond to functional elements, e.g., implemented by hardware, software, or a combination thereof.

Figure 7:
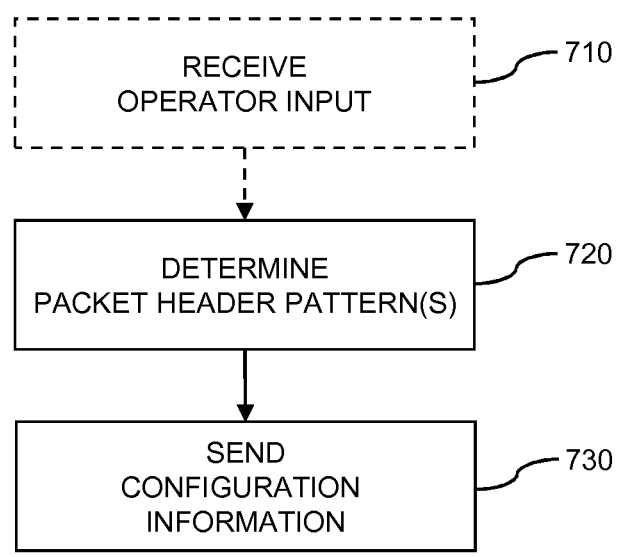
FIG. 7 shows a flowchart for schematically illustrating a method of controlling monitoring of network traffic according to an embodiment of the invention.

FIG. 7 shows a flowchart for illustrating a method which may be utilized for implementing the illustrated concepts in a management node, e.g., the management node 130. If a processor-based implementation of the management node is used, the steps of the method may be performed by one or more processors of the management node. In such a case the management node may further comprise a memory in which program code for implementing the below described functionalities is stored.

At optional step 710, the management node may receive operator input. Such operator input may for example define protocol types of interest or certain traffic types of interest, which are in turn associated with utilization of corresponding protocol types. The operator input may be provided manually to the management node or may be received from an external source.

At step 720, the management node determines a set of one or more packet header patterns. This may be accomplished based on the operator input optionally received at step 710 and/or based on rules configured in the management node. Each packet header pattern may be defined by a sequence of one or more protocol types. Examples of such packet header patterns are illustrated in FIG. 3.

At step 730, the management node sends configuration information to at least one network node configured to sample data packets of network traffic, e.g., to the traffic monitor nodes 110. The set of one or more packet header patterns enables the at least one network node to compare, for each sampled data packet, a packet header of the sampled data packet to the set of one or more packet header patterns, depending on the comparison, determine a length of a packet header portion to be extracted from the sampled data packet, extract the packet header portion of the determined length from the sampled data packet, and generate a datagram comprising the extracted packet header portions of the sampled data packets, e.g., as explained in connection with steps 520 to 560 of FIG. 5.

The length of the packet header portion extracted from the sampled data packet may differ between at least some of the sampled data packets. The datagram may correspond to an sFlow datagram. However, it is to be understood that other datagram formats could be utilized as well.

Figure 8:
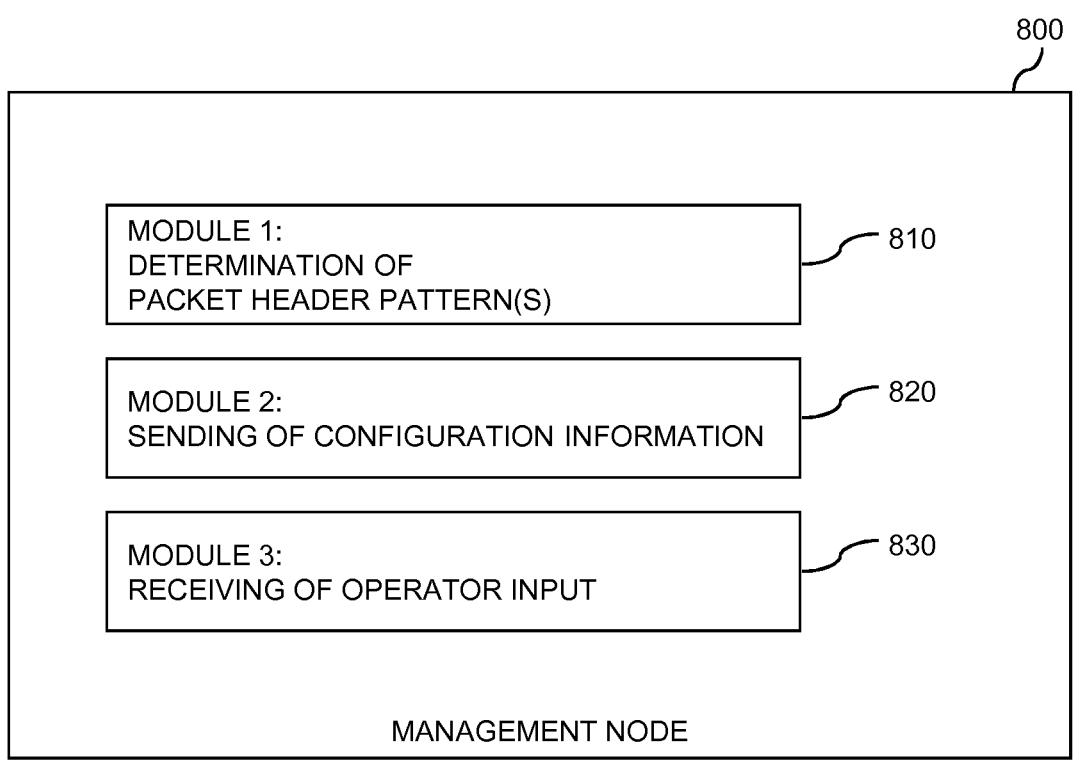
FIG. 8 shows a block diagram for illustrating functionalities of a management node according to an embodiment of the invention.

FIG. 8 shows a block diagram for illustrating functionalities of a management node 800 which operates according to the method of FIG. 7. As illustrated, the management node 800 may be provided with a module 810 configured to determine a set of one or more packet header patterns, such as explained in connection with step 720. Further, the management node 800 may be provided with a module 820 configured to send configuration information indicating the set of one or more packet header patterns to at least one network node configured to sample data packets of network traffic, such as explained in connection with step 730. Further, the management node 800 may be provided with a module 830 configured to receive operator input, such as explained in connection with step 710.

It is noted that the management node 800 may also include further modules for implementing other functionalities as described above, such controlling operations of a further node network node which is responsible for collecting and analysing the datagrams generated by a plurality of network nodes. Further, it should be understood that the modules of the management node 800 do not necessarily represent a hardware structure of the management node 800, but may also correspond to functional elements, e.g., implemented by hardware, software, or a combination thereof.

Figure 9:
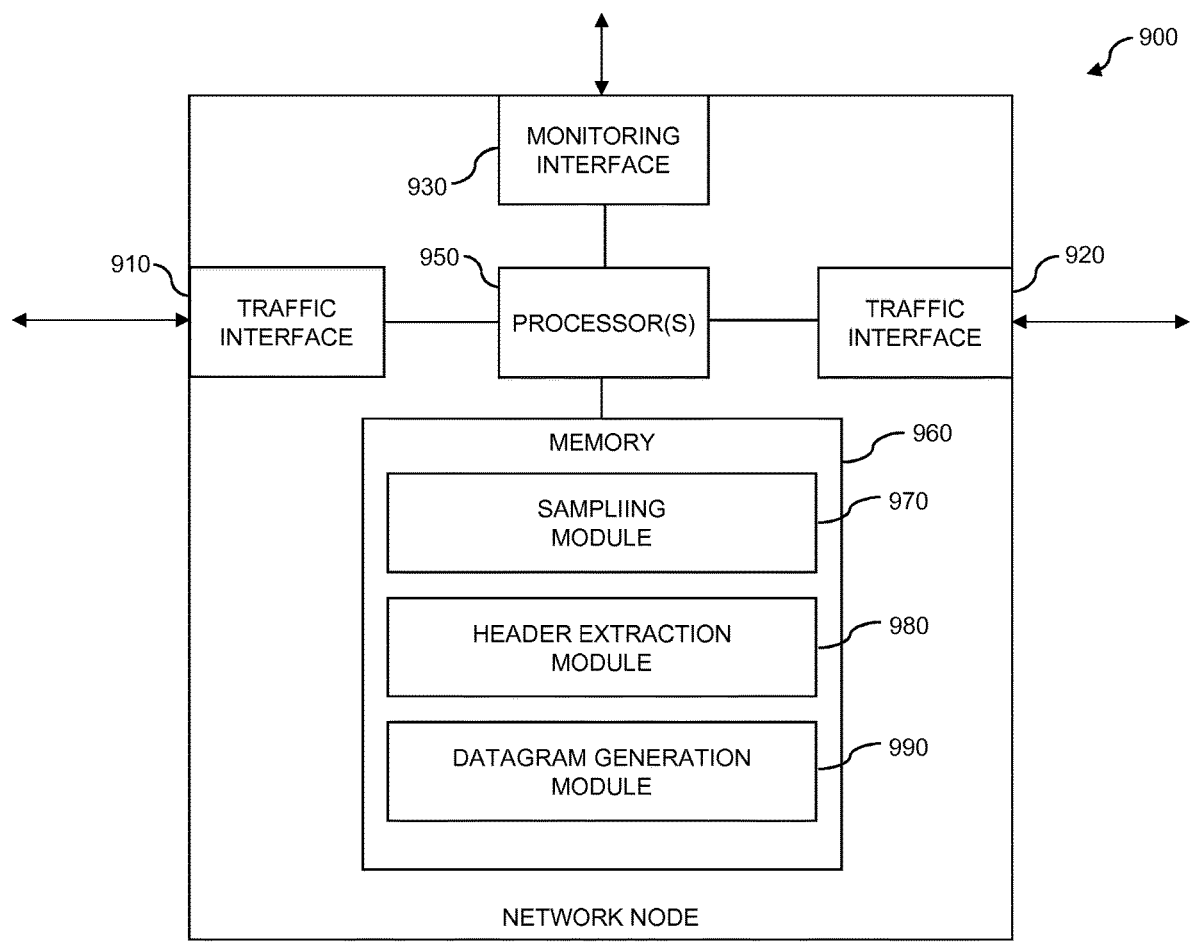
FIG. 9 schematically illustrates structures of a network node according to an embodiment of the invention.

It is to be understood that the methods of FIGS. 5 and 7 may be combined in a system including a plurality of network nodes operating according to the method of FIG. 5, and a management node which operates according to the method of FIG. 7 and sends configuration information indicating the set of one or more packet header patterns to the network nodes. In addition or as an alternative to the management node, such system may also include a further network node which is configured to receive the datagrams from the network nodes and analyse the received datagrams. FIG. 9 illustrates exemplary structures which may be used for implementing the above concepts in a network node 900. The network node 900 may for example correspond to one of the traffic monitor nodes 110.

As illustrated, the network node 900 may include traffic interfaces 910, 920 for receiving and forwarding network traffic. The traffic interfaces 910, 920 may be based on various protocol types and various transmission media.

Further, the network node 900 may include one or more processors 950 coupled to the interfaces 910, 920, and a memory 960 coupled to the processor(s) 950. The memory 960 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 960 includes suitably configured program code to be executed by the processor(s) 950 so as to implement the above-described functionalities of a network node. In particular, the memory 960 may include various program code modules for causing the node 900 to perform processes as described above, e.g., corresponding to the method steps of FIG. 5.

As illustrated, the memory 960 may include a sampling module 970 for implementing the above-described functionalities of sampling data packets of network traffic, e.g., as explained in connection with step 520 of FIG. 5. Further, the memory 960 may also include a header extraction module 980 for implementing the above-described functionalities of extracting a packet header portion of a determined length from the sampled data packet, such as explained in connection with steps 530 to 550 of FIG. 5. Further, the memory 960 may include a datagram generation module 990 for implementing the above-described functionalities of generating a datagram including extracted packet header portions.

It is to be understood that the structures as illustrated in FIG. 9 are merely schematic and that the network node 900 may actually include further components which, for the sake of clarity, have not been illustrated, e.g., further interfaces or processors. Also, it is to be understood that the memory 960 may include further types of program code modules, which have not been illustrated, e.g., program code modules for implementing known functionalities of a router or switch. Here, it is also noted that the illustrated functionalities associated with the monitoring of the network traffic, in particular for processing the packet headers, may be implemented separately from primary functionalities of the network node, such as router or switch operation. Specifically, separate hardware modules and/or software modules may be provided for this purpose, to avoid compromising performance of the network node with respect to the primary functionalities. According to some embodiments, also a computer program may be provided for implementing functionalities of the network node 900, e.g., in the form of a physical medium storing the program code and/or other data to be stored in the memory 960 or by making the program code available for download or by streaming.

Figure 10:
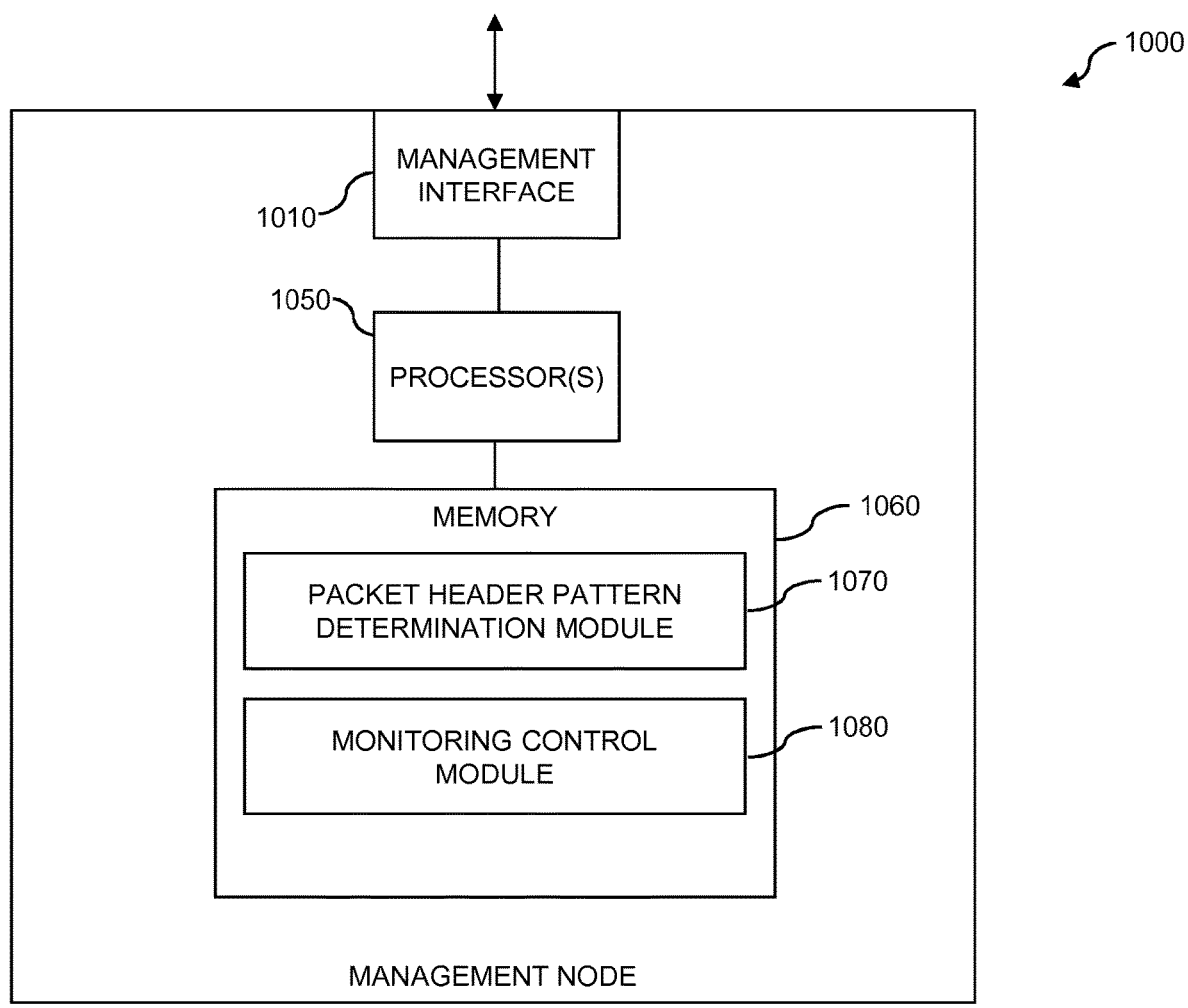
FIG. 10 schematically illustrates structures of a management node according to an embodiment of the invention.

FIG. 10 illustrates exemplary structures which may be used for implementing the above concepts in a management node 1000. The management node 1000 may for example correspond to the management node 130.

As illustrated, the management node 1000 may include a management interfaces 1010 for sending configuration information, e.g., to a plurality of network nodes responsible for sampling data packets. The management interface 1010 may be based on various protocol types and various transmission media.

Further, the management node 1000 may include one or more processors 1050 coupled to the interface 1010, and a memory 1060 coupled to the processor(s) 1050. The memory 1060 may include a ROM, e.g., a flash ROM, a RAM, e.g., a DRAM or SRAM, a mass storage, e.g., a hard disk or solid state disk, or the like. The memory 1060 includes suitably configured program code to be executed by the processor(s) 1050 so as to implement the above-described functionalities of a management node. In particular, the memory 1060 may include various program code modules for causing the node 1000 to perform processes as described above, e.g., corresponding to the method steps of FIG. 7.

As illustrated, the memory 1060 may include a packet header pattern determination module 1070 for implementing the above-described functionalities of determining a set of one or more packet header patterns, e.g., as explained in connection with step 720 of FIG. 7. Further, the memory 1060 may also include a monitoring control module 1080 for implementing the above-described functionalities of generating control information indicating the determined set of packet header patterns or other control information related to the monitoring of network traffic.

It is to be understood that the structures as illustrated in FIG. 10 are merely schematic and that the management node 1000 may actually include further components which, for the sake of clarity, have not been illustrated, e.g., further interfaces or processors. Also, it is to be understood that the memory 1060 may include further types of program code modules, which have not been illustrated, e.g., program code modules for implementing known functionalities of a management node. According to some embodiments, also a computer program may be provided for implementing functionalities of the management node 1000, e.g., in the form of a physical medium storing the program code and/or other data to be stored in the memory 1060 or by making the program code available for download or by streaming.

As can be seen, the concepts as described above may be used for efficiently extracting packet header portions from sampled data packets. As a result, sFlow datagrams or similar datagrams including extracted packet header portions may be generated in an efficient manner, e.g., with optimized network usage associated with transmission of the datagrams and reduced latency as compared to conventional sFlow datagrams. Since no changes to the sFlow datagram format are required, the concepts may be implemented in a manner which is compatible to the existing sFlow technology, without requiring modifications of the sFlow Collector. Further, the concepts may be applied to various protocol layers, e.g., including OSI (Open System Interconnections) layers 2 to 7. As compared to the conventional sFlow technology or similar technologies, improved scaling characteristics can be achieved, since the recipient of the datagrams, e.g., the sFlow Collector, needs to handle less and/or smaller datagrams.

It is to be understood that the examples and embodiments as explained above are merely illustrative and susceptible to various modifications. For example, the illustrated concepts may be applied in connection with various communication network technologies. Further, the illustrated concepts may be applied in connection with various kinds of monitoring technologies and datagram formats. Moreover, it is to be understood that the above concepts may be implemented by using correspondingly designed software to be executed by one or more processors of an existing device, or by using dedicated device hardware. Further, it should be noted that in some scenarios the network node receiving the datagrams and the management node could be integrated in the same device, e.g., in an OSS (Operation Support System) node.

The invention claimed is:

1. A method of monitoring network traffic, the method comprising a network node:
sampling data packets of network traffic;
for each sampled data packet, comparing a packet header of the sampled data packet to a set of one or more packet header patterns, wherein each packet header pattern is defined by a sequence of one or more protocol types;
determining, depending on the comparison, a length of a packet header portion to be extracted from the sampled data packet;
extracting the packet header portion of the determined length from the sampled data packet; and
generating a datagram comprising the extracted packet header portions of the sampled data packets, wherein the method further comprising:
based on the comparison, determining a packet header pattern from the set which best matches the packet header of the sampled data packet; and
determining the length in such a way that the packet header portion to be extracted includes protocol headers corresponding to the sequence of protocol types defining the best matching packet header pattern.

2. The method of claim 1, further comprising the network node: in the sampled data packet, identifying:
a first byte of a first protocol header of the sequence of protocol types defining the best matching packet header pattern; and
a last byte of a last protocol header of the sequence of protocol types defining the best matching packet header pattern; and
determining the packet header portion to be extracted to extend from the first byte of the first protocol header of the sequence of protocol types defining the best matching packet header pattern to the last byte of the last protocol header of the sequence of protocol types defining the best matching packet header pattern.

3. The method of claim 1, further comprising the network node, in response to identifying no packet header pattern from the set which matches the packet header of the sampled data packet, determining the length to correspond to a configured maximum length.

4. The method of claim 1, wherein the length of the packet header portion extracted from the sampled data packet differs between at least some of the sampled data packets.

5. The method of claim 1, further comprising the network node transmitting the datagram to a further network node for analysis.

6. The method of claim 1, further comprising the network node receiving configuration information indicating the set of one or more packet header patterns from a management node.

7. The method of claim 1, wherein the datagram corresponds to an sFlow datagram.

8. A method of controlling monitoring of network traffic by a management node, the method comprising:
determining a set of one or more packet header patterns; and
sending configuration information indicating the set of one or more packet header patterns to at least one network node configured to sample data packets of network traffic, wherein each packet header pattern is defined by a sequence of one or more protocol types;
wherein the set of one or more packet header patterns enables the at least one network node to:
compare, for each sampled data packet, a packet header of the sampled data packet to the set of one or more packet header patterns,
depending on the comparison, determine a length of a packet header portion to be extracted from the sampled data packet,
extract the packet header portion of the determined length from the sampled data packet; and
generate a datagram comprising the extracted packet header portions of the sampled data packets, wherein the network node is further caused to
based on the comparison, determine a packet header pattern from the set which best matches the packet header of the sampled data packet; and
determine the length in such a way that the packet header portion to be extracted includes protocol headers corresponding to the sequence of protocol types defining the best matching packet header pattern.

9. The method of claim 8, wherein the length of the packet header portion extracted from the sampled data packet differs between at least some of the sampled data packets.

10. The method of claim 8, wherein the datagram corresponds to an sFlow datagram.

11. A network node, comprising:
processing circuitry;
memory containing instructions executable by the processing circuitry whereby the network node is operative to:
sample data packets of network traffic;
for each sampled data packet, compare a packet header of the sampled data packet to a set of one or more packet header patterns, wherein each packet header pattern is defined by a sequence of one or more protocol types;
depending on the comparison, determine a length of a packet header portion to be extracted from the sampled data packet;
extract the packet header portion of the determined length from the sampled data packet; and
generate a datagram comprising the extracted packet header portions of the sampled data packets, wherein the instructions are such that the network node is operative to:
based on the comparison, determine a packet header pattern from the set which best matches the packet header of the sampled data packet; and
determine the length in such a way that the packet header portion to be extracted includes protocol headers corresponding to the sequence of protocol types defining the best matching packet header pattern.

12. The network node of claim 11, wherein the instructions are such that the network node is operative to:
in the sampled data packet, identify:
a first byte of a first protocol header of the sequence of protocol types
defining the best matching packet header pattern; and a last byte of a last protocol
header of the sequence of protocol types defining
the best matching packet header pattern; and
determine the packet header portion to be extracted to extend from the first byte of the first protocol header of the sequence of protocol types defining the best matching packet header pattern to the last byte of the last protocol header of the sequence of protocol types defining the best matching packet header pattern.

13. The network node of claim 12, wherein the instructions are such that the network node is operative to in response to identifying no packet header pattern from the set which matches the packet header of the sampled data packet, determine the length to correspond to a configured maximum length.

14. The network node of claim 11, wherein the length of the packet header portion extracted from the sampled data packet differs between at least some of the sampled data packets.

15. The network node of claim 11, wherein the instructions are such that the network node is operative to transmit the datagram to a further network node for analysis.

16. The network node of claim 11, wherein the instructions are such that the network node is operative to receive configuration information indicating the set of one or more packet header patterns from a management node.

17. The network node of claim 11, wherein the datagram corresponds to an sFlow datagram.

18. A management node, the management node being configured to:
   processing circuitry;
   memory containing instructions executable by the processing circuitry whereby the management node is operative to:
      determine a set of one or more packet header patterns, wherein each packet header pattern is defined by a sequence of one or more protocol types; and
      send configuration information indicating the set of one or more packet header patterns to at least one network node configured to sample data packets of network traffic;
   wherein the set of one or more packet header patterns enables the at least one network node to:
      compare, for each sampled data packet, a packet header of the sampled data packet to the set of one or more packet header patterns,
      depending on the comparison, determine a length of a packet header portion to be extracted from the sampled data packet,
      extract the packet header portion of the determined length from the sampled data packet, and
      generate a datagram comprising the extracted packet header portions of the sampled data packets,
   wherein the network node is enabled further to
      based on the comparison, determine a packet header pattern from the set which best matches the packet header of the sampled data packet; and
      determine the length in such a way that the packet header portion to be extracted includes protocol headers corresponding to the sequence of protocol types defining the best matching packet header pattern.

19. The management node of claim 18, wherein the length of the packet header portion extracted from the sampled data packet differs between at least some of the sampled data packets.

20. The management node of claim 18, wherein the datagram corresponds to an sFlow datagram.

21. A system, comprising:
   a plurality of network nodes, each network node configured to:
   sample data packets of network traffic;
   for each sampled data packet, compare a packet header of the sampled data packet to a set of one or more packet header patterns, wherein each packet header pattern is defined by a sequence of one or more protocol types;
   depending on the comparison, determine a length of a packet header portion to be extracted from the sampled data packet;
   extract the packet header portion of the determined length from the sampled data packet; and
   generate a datagram comprising the extracted packet header portions of the sampled data packets; and
   a further network node configured to:
      receive the datagrams from the plurality of network nodes; and
   wherein the network node is operative to:
      based on the comparison, determine a packet header pattern from the set which best matches the packet header of the sampled data packet; and
      determine the length in such a way that the packet header portion to be extracted includes protocol headers corresponding to the sequence of protocol types defining the best matching packet header pattern.

22. The system of claim 21, further comprising a management node configured to send configuration information indicating the set of one or more packet header patterns to the plurality of network nodes.

23. The system of claim 22, wherein the management node is further configured to determine the set of one or more packet header patterns.

24. A non-transitory computer readable recording medium storing a computer program product for a network node for monitoring network traffic, the computer program product comprising software instructions which, when run on processing circuitry of the network node, causes the network node to:
   sample data packets of network traffic; for each sampled data packet, compare a packet header of the sampled data packet to a set of one or more packet header patterns;
   determine, depending on the comparison, a length of a packet header portion to be extracted from the sampled data packet;
   extract the packet header portion of the determined length from the sampled data packet; and
   generate a datagram comprising the extracted packet header portions of the sampled data packets, wherein the instructions further causes the network node to:
      based on the comparison, determine a packet header pattern from the set which best matches the packet header of the sampled data packet; and
      determine the length in such a way that the packet header portion to be extracted includes protocol headers corresponding to the sequence of protocol types defining the best matching packet header pattern.

25. A non-transitory computer readable recording medium storing a computer program product for a management node, the computer program product comprising software instructions which, when run on processing circuitry of the management node, causes the management node to:
   determine a set of one or more packet header patterns; and
   send configuration information indicating the set of one or more packet header patterns to at least one network node configured to sample data packets of network traffic;

wherein the set of one or more packet header patterns enables the at least one network node to:

compare, for each sampled data packet, a packet header of the sampled data packet to the set of one or more packet header patterns, depending on the comparison, determine a length of a packet header portion to be extracted from the sampled data packet, extract the packet header portion of the determined length from the sampled data packet; and generate a datagram comprising the extracted packet header portions of the sampled data packets, wherein the instructions further causes the network node to based on the comparison, determine a packet header pattern from the set which best matches the packet header of the sampled data packet; and determine the length in such a way that the packet header portion to be extracted includes protocol headers corresponding to the sequence of protocol types defining the best matching packet header pattern.

\* \* \* \* \*

UNITED STATES PATENT AND TRADEMARK OFFICE
CERTIFICATE OF CORRECTION

| | |
|---|---|
| PATENT NO. | : 10,523,536 B2 |
| APPLICATION NO. | : 15/769417 |
| DATED | : December 31, 2019 |
| INVENTOR(S) | : Jonas Rosenberg et al. |

It is certified that error appears in the above-identified patent and that said Letters Patent is hereby corrected as shown below:

On the Title Page

(72) Inventors: Jonas Emanuel Rosenberg, Stockholm (SE); Daniel Kang, Beijing (CN); Shahryar Khan, Stockholm (SE); Shuo Yang, Beijing (CN) should read -- (72) Inventors: Jonas Rosenberg, Stockholm (SE); Daniel Kang, Beijing (CN); Shahryar Khan, Stockholm (SE); Shuo Yang, Beijing (CN) --

Signed and Sealed this
Twenty-first Day of April, 2020

Andrei Iancu
*Director of the United States Patent and Trademark Office*